Figure 1:
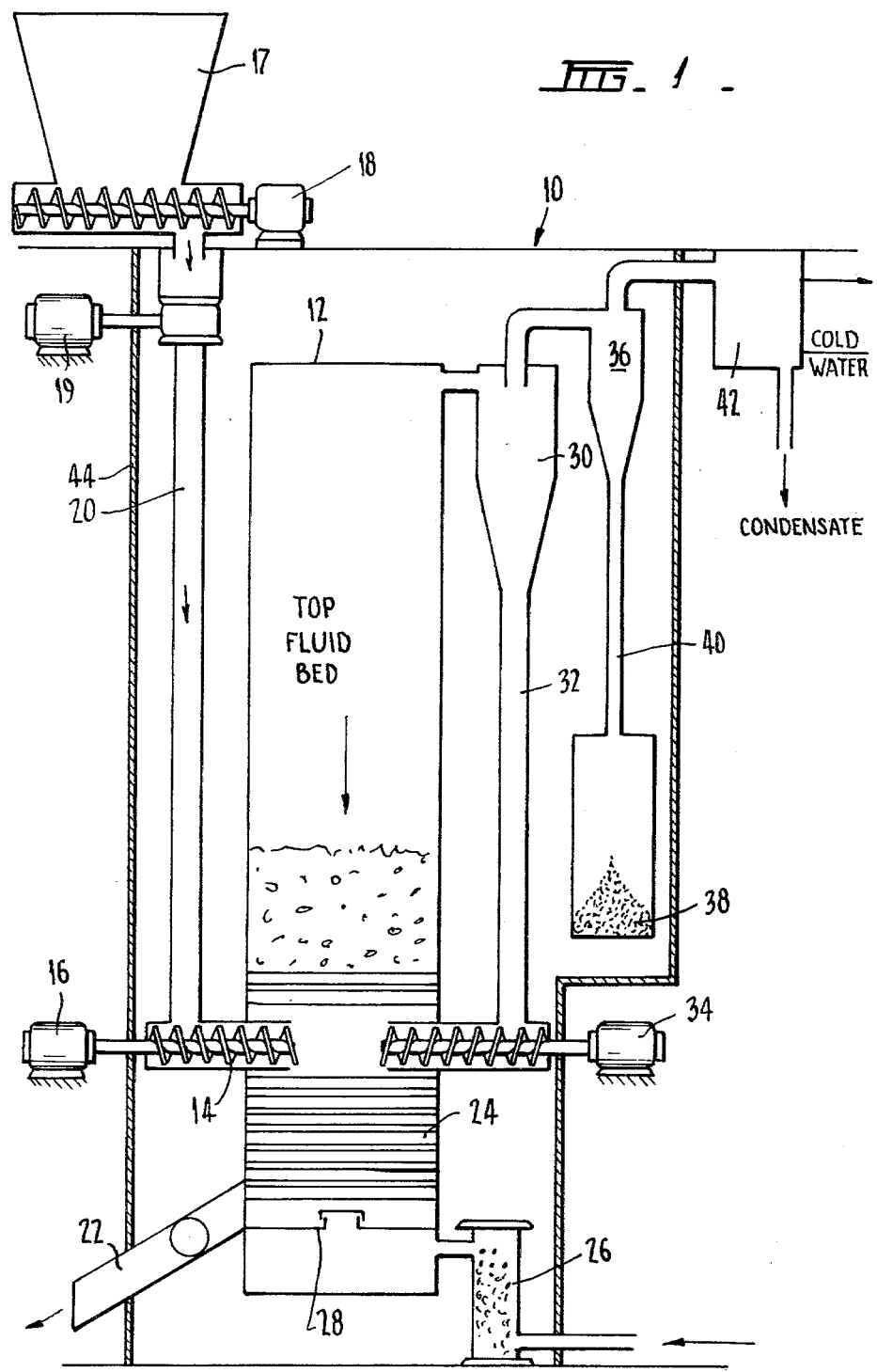

United States Patent [19]

Potter

[11] 4,224,288
[45] Sep. 23, 1980

[54] ALUMINA PRODUCTION

[75] Inventor: Owen E. Potter, Camberwell, Australia

[73] Assignee: Monash University, Clayton, Australia

[21] Appl. No.: 10,082

[22] Filed: Feb. 6, 1979

[30] Foreign Application Priority Data

Jan. 8, 1979 [AU] Australia ............................ 43201/79

[51] Int. Cl.² ................................................ C01F 7/44
[52] U.S. Cl. .......................... 423/123; 423/DIG. 16; 423/625; 423/121; 423/127; 34/10
[58] Field of Search ............... 423/127, 625, 121, 123, 423/DIG. 16; 34/10

[56] References Cited

U.S. PATENT DOCUMENTS

| | | | |
|---|---|---|---|
| 3,227,521 | 1/1966 | Carithers et al. | 423/625 |
| 3,265,465 | 8/1966 | Turpin | 423/625 |
| 3,336,109 | 8/1967 | Du Bellay et al. | 423/625 |
| 3,408,159 | 10/1968 | Teichner et al. | 423/625 |
| 3,408,745 | 11/1968 | Filippi et al, | 423/625 |
| 3,529,356 | 9/1970 | Diettrich | 423/625 |
| 3,565,408 | 2/1971 | Reh et al. | 423/625 |
| 3,864,461 | 2/1975 | Miller et al. | 423/625 |

*Primary Examiner*—Herbert T. Carter
*Attorney, Agent, or Firm*—Larson, Taylor and Hinds

[57] ABSTRACT

In a process for the production of alumina which comprises the steps of digesting bauxite to produce a precipitate of alumina trihydrate containing uncombined moisture, drying the alumina trihydrate to reduce the uncombined moisture content thereof, and feeding the dried alumina trihydrate to a calciner to convert the alumina trihydrate to alumina, improved economy is achieved by drying the alumina trihydrate in a fluidized bed in which the fluidized mass is heated indirectly by means of steam which is available from the digestion and recovery system. Drying of the alumina trihydrate in this manner prior to feeding it to the calciner also reduces the fuel requirement in the calciner and enables the throughput of the calciner to be increased.

5 Claims, 1 Drawing Figure

U.S. Patent

Sep. 23, 1980

4,224,288

ALUMINA PRODUCTION

The present invention relates to the production of alumina.

Alumina is produced in large quantities from the mineral bauxite. Conventionally, in the production of alumina the bauxite is dissolved in caustic liquors at temperatures of 140° C. to 250° C. which temperatures are achieved by the use of steam under high pressure. This processing operation is known as digestion and is carried out in vessels called digestors.

The solution from the digestors is cooled and seeded with fine crystalline alumina hydrate to precipitate alumina trihydrate, $Al_2O_3.3H_2O$. The hydrate is filtered from the spent liquors, washed and then converted by high temperature calcination into high grade alumina which is raw material for the production of aluminium metal by electrolytic means. The hydrate contains, in addition to chemically combined water of constitution, an amount of uncombined moisture. The uncombined moisture typically amounts to about 12% by weight of the moist hydrate from the filters. The calcination of the hydrate is typically conducted in a rotary kiln or fluidized bed system fired wil oil or gas.

In the prior art systems fuel is required in the calcination step to vapourize umcombined water and heat it to the calciner outlet temperature, to dehydrate chemically the alumina trihydrate to form $\gamma$-$Al_2O_3$ and to partially convert the $\gamma$-$Al_2O_3$ to $\alpha$-$Al_2O_3$.

The chemical dehydration although complex may be simplified into two stages as follows:

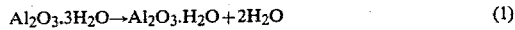
$$Al_2O_3.3H_2O \rightarrow Al_2O_3.H_2O + 2H_2O \quad (1)$$

$$Al_2O_3.H_2O \rightarrow Al_2O_3 + H_2O \quad (2)$$

The water vapour produced in the chemical dehydration is discharged from the calciner at the outlet temperature, together with the combustion gases.

It has now been found that the efficiency of the whole operation can be improved by drying the alumina trihydrate to reduce the uncombined moisture content thereof prior to feeding the alumina trihydrate to the calciner. The drying is effected by feeding the moist alumina trihydrate to fluidized bed apparatus in which the fluidized mass is heated indirectly by means of steam which is available from the digestion and caustic recovery system. This steam is low-grade steam which typically has a pressure of from 3 to 12 atmospheres. This steam has been ascribed a low commercial value because it has already been used in the digestion and caustic recovery system.

However, if this steam is used to indirectly heat the fluidized mass of alumina trihydrate such as by passing it through tubes in the fluidized bed its heat content is at least partially transferred to the fluidized mass and causes uncombined moisture to be driven off from the fluidized mass. To obtain a good heat transfer the steam needs to be saturated and thus, if necessary, the steam from the digestors is preferably de-superheated prior to being fed to the fluidized bed for indirect heating. Preferably the steam is saturated steam at a temperature in the range from 125° C. to 250° C. more preferably 150° C. to 190° C. such as 170° C.

The indirect heating not only drives off uncombined moisture but also causes the temperature of the alumina trihydrate to be raised, for example to 100° C.–120° C. such as about 115° C.

In the calciner the alumina is typically raised to a final temperature of 1100° C.–1200° C. to enable partial conversion to $\alpha$-$Al_2O_3$ to take place. Compared to prior art methods it is found that the pre-drying step of the present invention significantly reduces the fuel requirement in the calciner because fuel is not required to vapourize the uncombined moisture which has been removed and because the alumina trihydrate is partially pre-heated. Further, the fuel required depends on the exit temperature of the flue gases, such as 280° C. to 300° C., heat losses by convection and the extent of heat recovery from the hot solids. Normally the hot solids are used to preheat combustion air for the calciner. The size of the calciner is based on the maximum gas velocity which is permissible and therefore a reduction in gas volume per unit of alumina makes it possible to increase the throughput of alumina in the calciner.

For example, in a kiln-type calcining operation the combined volume of combustion gases and water from uncombined moisture and chemical dehydration can fall by about twenty percent when the alumina hydrate is pre-dried. This reduction in unit gas volume makes it possible to increase the throughput by more than twenty percent. Furthermore it is an additional gain since convection and radiation heat losses do not alter as the throughput increases so that the convection and radiation losses decrease per unit of product as the throughput increases. The net result is a substantial and surprising gain from pre-drying.

Preferably the fluidizing medium for the fluidized bed is steam. In this case, some carrier steam is introduced into the bottom of the fluidized bed to initiate and maintain fluidization whilst additional fluidization is achieved by the moisture driven off from the alumina trihydrate. The carrier steam may be obtained from the same source as the indirect heating steam i.e. from the digestion and caustic recovery system or it may be product vapour from the fluidized bed which has been recycled. The requirement for carrier steam can be reduced by tapering the bed so that its cross sectional area increases from bottom to top.

The product vapour from the fluidized bed is clean steam at atmospheric pressure. When, as is usually the case, the fluidized bed is operated at or near atmospheric pressure the product vapour may, after separation of entrained solids such as in a cyclone, be used for process heating or in a steam generator to produce clean steam which can be compressed to high pressure. There is a large requirement in alumina manufacture for process heating particularly heating of water but also of air proceeding to combustion.

When the product vapour after cleaning in cyclones is condensed in some process heating or steam generation plant, then it may contain some alumina trihydrate which can be recovered by returning the condensate to the filters as wash water.

As an alternative to steam, the fluidizing medium can be another gas such as air. The product vapour in this case is the other gas saturated with steam. The saturated gas thus produced passes to a separator such as a cyclone and then has to be finally cleaned by either bag filters or electrostatic precipitators. Thus, additional expense is incurred over the preferred embodiment using steam as the fluidizing medium.

The present invention will now be described by way of Example with reference to the accompanying drawings in which:

FIG. 1 is a schematic side elevation in section of a pilot plant dryer used in the process of the present invention.

In FIG. 1 there is shown a fluidized bed apparatus 10 comprising a housing 12 having inlet means 14 for moist alumina trihydrate from bauxite digestors (not shown). The moist alumina trihydrate is passed through the inlet means 14 by means of a screw feed 16. The moist alumina trihydrate is supplied from a hopper 17 and fed to the screw feed 16 by means of a screw feed 18 at the bottom of the hopper 17 and a rotary feed 19 at the top of a vertical conduit 20 leading from the hopper 17 to the screw feed 16.

Dried alumina trihydrate is removed continuously in use from the housing 12 at a rate corresponding to the rate of feed by means of a conveyor 22 at the bottom of the fluidized bed.

The housing contains adjacent its lower end a plurality of horizontal parallel spaced tubes 24 which in the pilot plant are electrically heated but which in practice would be heated by saturated steam from the digestors as discussed above. The tubes are 1 inch diameter on a 2 inch triangular pitch but any other diameter and appropriate pitch may be employed such as 2 inch tubes on a 6 inch pitch, particularly where carrier steam is used.

Saturated steam is fed through a superheater 26 into the lower end of the housing 12 and thence through a distributor 28.

Steam produced in the housing 12 is fed to a cyclone 30 in which most of the particulate matter contained therein is removed and recycled to the fluidized bed through a conduit 32 and a return feed screw 34. Alternatively, the particulate matter could be taken as product if sufficiently dry. The steam issuing from the cyclone 30 is fed to a further cyclone 36 in which the remainder of the particulate material is removed and deposited in a collection means 38 via a conduit 40. The steam issuing from the further cyclone 36 is condensed in a condenser 42. The drawing illustrates a pilot plant operation which demonstrates the feasibility of the concept of drying by fluidization using indirect heating and using steam as the fluidizing medium. This object is achieved by the illustrated apparatus and thus no attempt is made to reuse the steam in the ways discussed hereinabove. However, it is clear that instead of being merely condensed in condenser 42 the steam could be used for, for example, process heating.

The heated portions of the apparatus illustrated in FIG. 1 are enclosed in a thermally insulating jacket 44 although in actual practice each component would then be individually thermally lagged possibly with steam tracer heating inside the lagging to avoid condensation occuring on the inside surfaces of the drying vessel and components.

In use, particulate moist alumina trihydrate is fed from the hopper 17 by means of screw feed 18, rotary feed 19, via conduit 20 to screw feed 16. The screw feed 16 feeds the moist alumina trihydrate into the housing 12 in a continuous manner. At the same time the tubes 24 are heated electrically although they could equally well be heated by saturated steam as discussed above. The heat transfer from the tubes 24 to the moist alumina trihydrate causes steam is to be driven off from the moist alumina trihydrate which steam fluidizes the particles to form a fluidized bed. To assist in fluidization particularly in the lower regions of the bed, as discussed above, some superheated carrier steam is fed through the distributor 28.

Steam is evolved from the bed and rises to the top of the housing 12 from where it passes to the cyclone 30 as discussed above.

At the same time dried alumina trihydrate is removed by conveyor 22 from the bottom of the fluidized bed. The residence time of the alumina trihydrate is so arranged that under the conditions employed a desired amount of uncombined moisture such as 90% of the total is removed therefrom. A typical residence time is of the order of 40 minutes.

The dried alumina trihydrate is fed to a calciner (not shown) wherein it is converted to alumina as discussed above.

It has been found that, using the dryer of FIG. 1 which has a cross section of 1 square foot and heating the tubes to a temperature consistent with that of steam available from the digestion and caustic recovery system in an alumina plant, a throughput of 5 to 10 tons/-day of moist alumina trihydrate was obtained depending on the exact uncombined moisture content.

Modifications and variations such as would be apparent to a skilled addressee are deemed within the scope of the present invention.

For example, the product vapour can be used in multi-stage drying as described in our copending patent application based on Australian Patent Application No. PD 3344. In particular it is envisaged that there can be a first fluidized bed in which the fluidizing medium is steam and in which the indirect heating is accomplished by steam and a second fluidized bed in which the fluidizing medium is another gas such as air, and in which the indirect heating is accomplished by the product vapour from the first fluidized bed.

We claim:

1. A process for the production of alumina which comprises the steps of digesting bauxite by dissolving it in caustic liquors at 140° C. to 250° C. under pressure, and cooling and seeding the resulting solution to produce a precipitate of alumina trihydrate containing uncombined moisture, drying the alumina trihydrate to reduce the uncombined moisture content thereof, and feeding the dried alumina trihydrate to a calciner to convert the alumina trihydrate to alumina, characterized in that the alumina trihydrate is dried by feeding it to a fluidized bed apparatus in which the fluidized mass is alumina trihydrate and in which the fluidized mass is heated indirectly by means of steam from the digestion and caustic recovery system, said steam used for indirect heating being saturated stem having a temperature in the range from 125° C. to 250° C.

2. A process according to claim 1 in which the temperature of the steam is in the range from 150° C. to 190° C.

3. A process as claimed in claim 1 in which the fluidizing medium for the fluidized mass is steam.

4. A process as claimed in claim 3 in which the product vapour is passed to a separator to remove entrained alumina trihydrate, and is then used for process heating.

5. A process as claimed in claim 1 in which the fluidizing medium for the fluidized mass is air and product vapour from the fluidized bed is air saturated with steam.

* * * * *